United States Patent [19]

Nutt

[11] Patent Number: 5,333,572
[45] Date of Patent: Aug. 2, 1994

[54] THERMOSTATIC ANIMAL FEEDER

[76] Inventor: A. D. Nutt, 8503 Stanton Dr., Little Rock, Ark. 72209

[21] Appl. No.: 100,767

[22] Filed: Aug. 2, 1993

[51] Int. Cl.[5] ............................................. A01K 5/00
[52] U.S. Cl. .............................. 119/57.91; 239/397.5; 239/379; 222/199
[58] Field of Search ..................... 119/51.04, 53, 56.1, 119/57.1; 222/199; 239/397.5, 375

[56] References Cited

U.S. PATENT DOCUMENTS

| | | | |
|---|---|---|---|
| 3,195,508 | 7/1965 | Lehman et al. | 119/57.91 X |
| 3,717,127 | 2/1973 | Poterfield | 119/57.91 X |
| 4,565,159 | 1/1986 | Seeeney | 119/57.91 X |
| 5,143,289 | 9/1992 | Gresham et al. | 119/57.91 X |

FOREIGN PATENT DOCUMENTS 1594447  7/1981  United Kingdom ............. 119/51.04

*Primary Examiner*—Thomas Price
*Attorney, Agent, or Firm*—Stephen D. Carver

[57] ABSTRACT

A rotary animal feeder that slowly, periodically discharges feed in response to temperature changes. Preferably the feeder is hung from a tree over an animal trail. A cylindrical pail stores a quantity of feed to be dispensed. Feed is drawn downwardly by gravity to an activator assembly comprising a discharge tube in fluid flow communication with the pail interior. A plurality of radially spaced apart discharge orifices are formed in the tube. A convex floor adjustably, coaxially secured within the tube mounts a rotary impeller proximate the discharge orifices. A bimetallic spring beneath the floor torsionally drives the impeller in response to temperature changes. Feed contacting the convex floor is slowly deflected outwardly towards the discharge orifices both by the shape of the convex floor plate and impeller contact. As the temperature changes the impeller slowly rotates, and feed is gently urged toward and through these orifices. Rotary impeller motion maintains efficiency, reduces noise, and minimizes jamming. The feeder is adjustable to vary the feed output rate. An external restrictor band that circumferentially, coaxially attaches to the discharge tube can be positioned to block the discharge orifices. Alternatively, it can be moved to partially blocked or completely unblocked positions. The impeller and the convex floor can be moved vertically upwardly or downwardly within the discharge tube toward or away from the discharge orifices. Daily temperature changes that rotate the impeller operate the feeder without electricity.

20 Claims, 5 Drawing Sheets

THERMOSTATIC ANIMAL FEEDER

BACKGROUND OF THE INVENTION

1. Field of the Invention

My invention relates generally to animal feeders, specifically deer feeders. More particularly, my invention relates to deer feeders of the type left in the woods for periodically scattering grain about an area frequented by deer. Art pertaining to the invention is seen in United States Class 119, sub-classes 57.91 and 57.92, class 119, sub-class 51R, as well as other sub-classes within Class 119.

2. Discussion of the Prior-Art

Feeders for wild game are well known in the prior art. Usually they periodically dispense grain (i.e., corn) about a limited area within the woods for attracting game animals such as deer. Many experienced deer hunters recommend the use of multiple game feeders, that may be deployed along an established game trail within the deer woods. Typically, for deer hunting, game feeders are suspended from a tree by a wire so that access by squirrels and other undesired animals is restrained. In Arkansas, for example, the squirrels and wild hogs dwelling within the deer woods are attracted by deer feeders. The feeder must be elevated above the range of hogs, and ideally it should be suspended by a wire so that squirrels are uncomfortable seeking it. Once properly installed above an area through which deer traverse, deer will become accustomed to the feeder and they will be attracted to the hunting area.

Some feeders broadcast the feed by driving impellets with electric or wind-up motors. Some feeders depend upon batteries for operation. Some deer feeders depend upon the wind or contact with an animal for mechanical activation to occur. Some prior art feeders are activated by thermostatic expansion and contraction.

U.S. Pat. No. 4,945,859 issued Aug. 7, 1990, discloses a deer feeder having a bucket that leads to a conical section for dispensing feed. Feed is dispensed through the apparatus by an activator assembly coupled to the throat of a conical section by an elongated rod. When a deer contacts the feeder, or when the wind blows appropriately, feed will be dropped downwardly contacting a convex plate that deflects and thus distributes feed. The latter feeder is hung on a tree within a suitable deer area.

U.S. Pat. No. 4,986,220 issued Jan. 27, 1991, discloses a game feeder that can either be hung from a tree or disposed on the ground. It includes a generally cylindrical hopper terminating in a funnel-like output. A motor spins a rotary distributor for periodically broadcasting feed grain from the hopper.

U.S. Pat. No. 5,105,766 issued Apr. 21, 1992, is entitled "Buck Bucket." This deer feeder includes a pail containing grain that can be hung from a tree. When a feeder rod system passing through the pail is physically contacted by an animal, the contents are agitated. This causes grain to drop into the target feeding area. This device includes a flow adjustment system substantially different from mine.

Another pertinent patent reference known to me includes U.S. Pat. No. 3,867,904 issued Feb. 25, 1975. This reference shows an animal feeder adapted to be suspended from a tree. A relatively cylindrical hopper communicates with a lower discharge apparatus that is activated thermally. In other words, thermal expansion and contraction activate a rake assembly that reciprocally moves across a feed discharge zone to dispense feed in response to temperature changes.

Although numerous other patents exist, they are cumulative and relate generally to animal feeding, and not specifically to deer feeders.

For successful deer hunting, a number of parameters must be observed. First, the deer feeder must be highly reliable. It must resist the effects of wind, rain, and sunlight, while maintaining a high degree of reliability. If a deer feeder is connected to a source of electrical power for its motor, inconvenience and problems result. Batteries tend to wear out, and alternating current motors add obvious problems of complexity.

Actuator mechanisms must be reliable, but if they are too loud they can actually scare deer away. The feeder must be unobtrusive and easily functional without requiring too much maintenance. Where the distributor mechanism is wind powered, the resultant motion can frighten away deer, who are highly sensitive to movement. On the other hand, where electric motors broadcast the feed, the noise can be detrimental. Motor noises and feeder movement can seriously jeopardize game traffic along a given trail.

Where the dispenser mechanism requires contact with an animal, it usually must be hung at a lower location where the deer can reach and easily contact it. However, the lower a deer feeder is hung, the easier it becomes for squirrels, hogs, and black bears to contact it, using up the feed or destroying the apparatus.

Thermostatic bimetal is a composite material, usually in the form of a sheet, strip or spring, composed of two or more metallic layers. Each layer has a different coefficient of thermal expansion. The layers are permanently bonded together over their entire length. Such a material will bend or deflect proportionally with a change in temperature. As a bimetallic spring is heated one metal is prevented from expanding by the second. A considerable force is created causing a curvature of the metals, and hence an expansion of the spring along its established curvature.

I have determined that feed can be most efficiently distributed through a rotary action, but without motors or animal driven distributors. By the metallic spring arrangement I have suggested, thermodynamic forces, that are freely available as the temperature changes each day, actuate the apparatus. However, the feed is distributed in a rotary manner, that is highly reliable and which results in wider broadcasting of the feed. At the same time, disadvantages with battery powered apparatus are avoided. More particularly, it is desirable to prevent jamming through the rotary system I have disclosed herein, and reciprocal or gate-like mechanisms are prone to jamming.

SUMMARY OF THE INVENTION

I have invented a game feeder that is thermodynamically operated. It can be hung from a tree for reliably distributing grain about an area frequented by deer, and the only power necessary is derived from normal daily temperature changes. Grain is reliably broadcast radially from rotational impeller movement caused by a rotary thermostatic spring.

My feeder preferably comprises a generally cylindrical container, nominally a pail, for storing feed to be dispensed. The container contents are delivered by gravity to an activator assembly primarily comprising a discharge tube connected to the container bottom. The discharge tube is in fluid flow communication with the container interior, and it has a plurality of radially spaced apart discharge orifices through which game feed is dispensed by a rotary impeller. A bimetallic spring mechanism torsionally drives the impeller in response to temperature changes.

The spring mechanism preferably comprises a rotary, bimetallic spring mounted at the bottom of the activator assembly discharge tube. This spring is coupled to a drive shaft that intercommunicates with the rotary impeller. Preferably the drive shaft is journalled for rotation through a convex floor plate coaxially fitted with the discharge tube proximate the discharge orifices. Feed dropping into the discharge tube from the container tends to be moved outwardly towards the discharge orifices by the shape of the convex plate. Additionally, as the impeller slowly rotates, feed is gently urged toward and through these orifices.

The outer end of the bimetallic spring is fixed, the interior end provides circular movement about the center of the spring which is imparted to the shaft and impeller. The metals employed in the spring must result in expansion which follows the curvature of the spring. Many combinations of metals are possible depending on the shape and curvature of the spring. A mono-metallic spring would not maintain the necessary curvature. This would result in displacement of the center of movement of the spring, jamming the activator.

Importantly, rotary motion is employed to maintain efficiency and reduce noise and jamming. However, such a system must be appropriately adjustable. Two forms of adjustment are provided. The first adjustment includes an external restrictor band that circumferentially, coaxially attaches to the discharge tube. The user can slide the restrictor band up and down the discharge tube toward or away from the discharge orifices. For feeder installation the band can be positioned to block the discharge orifices altogether. Alternatively, it can be moved to a partially blocked position, to limit flow of feed through the apparatus. For maximum feed discharge the band can be moved to the tube bottom to completely expose the discharge orifices.

The second game feed rate adjustment system involves the impeller and the convex floor plate within the discharge tube upon which the impeller is mounted. The floor plate is adjustably, slidably mounted concentrically within the discharge tube. It may be moved vertically upwardly or downwardly within the discharge tube. Thus the position of the impeller and the floor plate can be varied relative to the discharge orifices. Floor plate position generally determines the rate at which feed is discharged, given a particular temperature swing. When the convex floor plate is slightly above the discharge orifices, maximum output occurs. At this time, the grain "sees"]an unobstructed orifice, and the grain is smoothly propelled by the impeller along the curved floor plate toward and out the orifices. Minimum grain output is achieved when the floor plate is disposed beneath the orifices. Grain traveling along the convex floor plate now encounters an impediment formed by the interior wall of the discharge tube beneath and adjacent the discharge orifices.

After the feeder has been appropriately installed, and securely hung from a tree branch with a wire, the restrictor band is moved and "fine tuning" of the feeder output can be accomplished. Afterwards, daily temperature changes will rotate the impeller. The direction of rotation will change each day, as the environment gradually warms during sunlight hours and cools during nighttime hours. As days and nights pass, limited rotation of the impeller both clockwise and counter-clockwise enables material flow through the discharge tube in a gradual and reliable manner.

The feeder tends not to jam because of the normal smooth, rotary action. It is quiet because of the thermal activating system, and it is configurable by the user to fit his application because of its adjustable features.

Therefore, it is a broad object of the present invention to provide a reliable, automatic deer feeder.

Another basic object is to provide a game feeder that operates efficiently without electric or wind-up motors.

A still further object is to provide a game feeder of the character described that does not require animal contact or wind movement for activation.

Another important object is to provide a game feeder that completely avoids batteries or electrical cords.

A similar object is to provide a quiet deer feeder that does not scare the deer.

A related object is to provide a deer feeder that minimizes movement so as to avoid detection by the deer.

Another important object is to provide a deer feeder that can be easily adjusted for a given situation by the hunter. It is a feature of the invention that the grain discharge rate can be adjusted to fit the application.

Another object is to provide a deer feeder with a "free" source of energy that can activate the apparatus. It is a feature of the invention that a rotary bimetallic spring element is employed for activation.

Another object is to provide a deer feeder of the character described that reliably broadcasts feed about an easily accessible area.

These and other objects and advantages of my invention will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
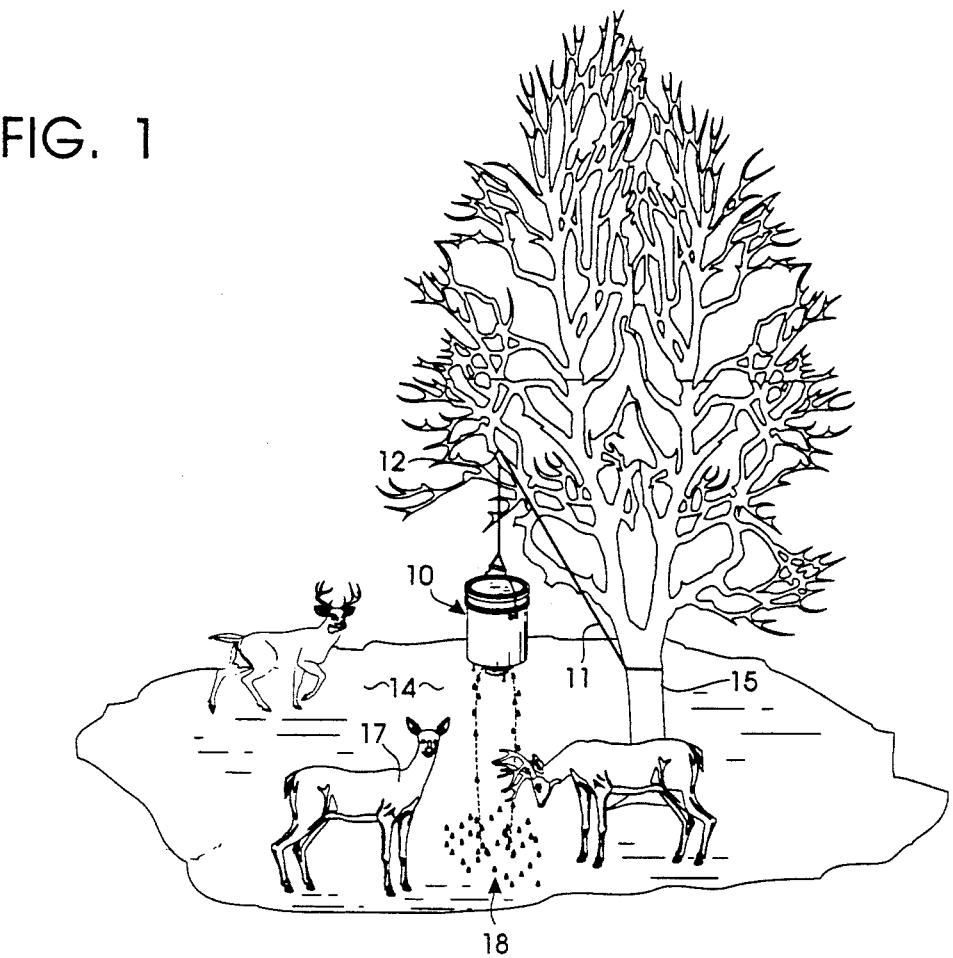
FIG. 1 is an environmental, pictorial view of the best mode of my game feeder, showing it installed in an area adjacent a game trail frequented by deer.

With initial reference now directed to FIGS. 1–4 of the appended drawings, my game feeder has been generally designated by the reference numeral 10. Feeder 10 is preferably suspended by an elongated rope 11 above a region 14 traversed by deer. Preferably the rope 11 is pulled over a branch 12 and tied to the trunk of tree 15 for easier owner access. Deer 17 that frequent area 14 will be exposed to particles of feed 16 dropped from the apparatus 10 through the apparatus to be described in detail hereinafter.

Feeder 10 preferably comprises a container formed by a rigid pail 18 that comprises a rigid, generally cylindrical midsection 20 having a bottom 22 and an upper portion 24. The upper portion 24 is reinforced by a conventional pair of circumferential reinforcing rings 26 that extend about the periphery of the pail between handle nubs 29. The handle, generally indicated by the reference number 30, is conventional, and it extends above the pail and may be tied with a rope in the manner shown in FIG. 1. A removable container cover 32 may be snap fitted to the pail to enclose the feed stored within the pail.

Figure 4:
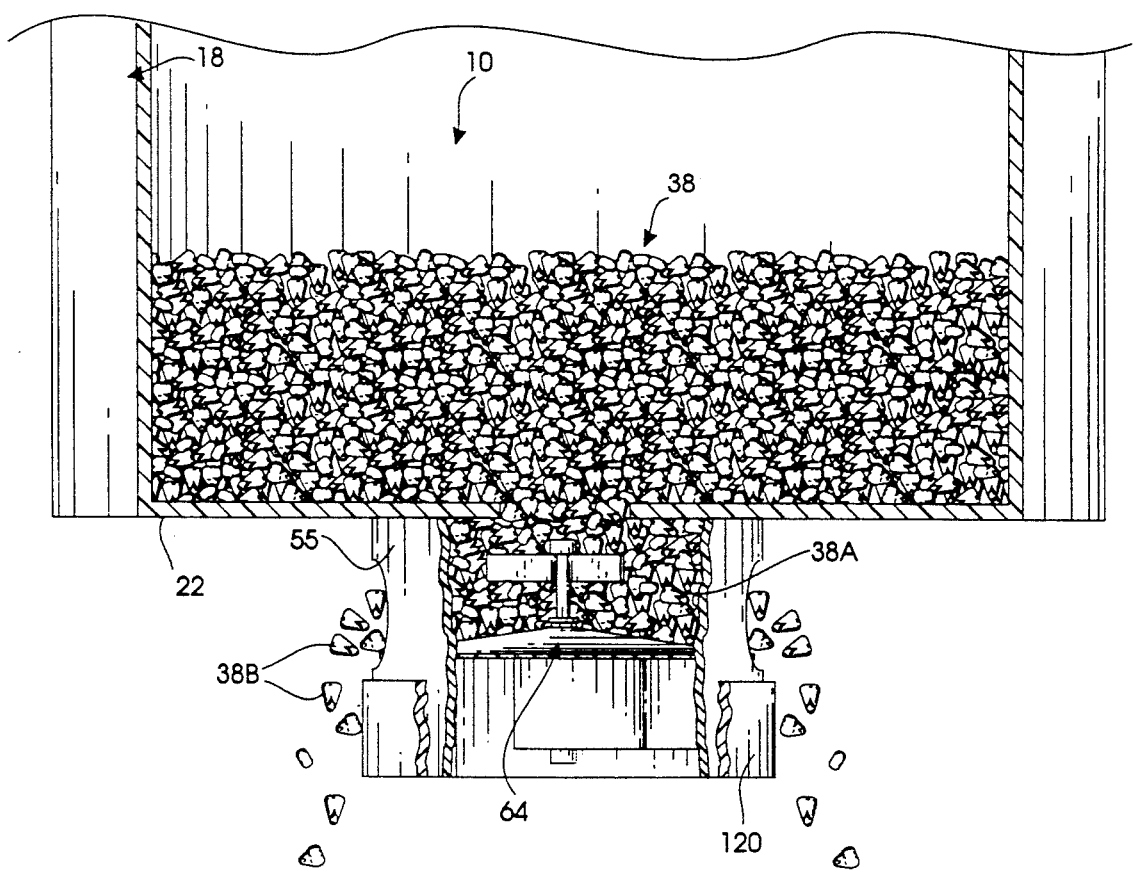
FIG. 4 is a enlarged, fragmentary isometric view showing how my game feeder holds and disperses feed, taken generally along line 4—4 of FIG. 3.

As seen in FIG. 4, the pail holds the feed, nominally corn, that has been generally designated by the reference number 38. Feed 38 is completely isolated within the pail when cover 32 is applied, and the only way out of the enclosure is through the activator assembly 40. As will be described in more detail hereinafter, feed 38A dropping into the activator assembly 40 (FIG. 4) is broadcast about the periphery of the activator assembly downwardly into region 14. Those pieces of feed that have been discharged from the activator assembly have been designated by the reference numeral 38B. A number of support feet 46 project downwardly from the bottom 22 of the pail so that the activator assembly is elevated above the ground when the pail is rested on the ground to be filled.

With reference primarily directed to FIGS. 5-8, the activator assembly 40 preferably comprises an elongated, resilient discharge tube 50 that projects downwardly from pail bottom 22. The discharge tube comprises a plurality of upwardly extending, radially spaced apart mounting tabs 52 (FIG. 5) that are received through suitable orifices 54 defined in the bottom 22 of the pail. In assembly, these tabs 52 project through holes 54, and they are folded into contact with the inner surface 22A of the pail bottom. The feed discharge tube 50 includes the plurality of radially spaced apart feed discharge orifices 56 that are preferably defined in its mid portion, and radially spaced apart at equal intervals. Feed 38, originally stored with the pail, falls through an orifice 59 (FIG. 5) into the interior of the discharge tube 50 for eventual expulsion through discharge orifices 56.

In the best mode, a rigid, convex floor plate 62 is concentrically mounted within the discharge tube. Floor plate 62 mounts an impeller, generally designated by the reference numeral 64, that is driven by a bimetallic rotary spring 66 in response to temperature changes. As impeller 64 rotates, feed 38A reaching the discharge tube interior is broadcast through discharge orifices 56. The convex upper surface 62A of floor plate 62 aids in guiding feed 38A towards the discharge orifices.

The floor plate 62 is slidable within the discharge tube. It can be vertically adjusted in position relative to discharge orifices 56. Floor plate 62 has a pair of spaced apart, upwardly projecting, mounting tabs 65. These tabs include mounting orifices 67 that are adapted to register with suitable mounting slots 69 defined in the discharge tube 50. Snap-fitting clips 70 are fitted within mounting orifices 67. Clips 70 provide a threaded seat for mounting screws 72 (FIGS. 5, 5A) that penetrate orifices 69 to secure the convex floor plate 62 within the discharge tube at a desired height.

The impeller assembly 64 comprises a rotating impeller 78 formed by a pair of cooperating wings 79. Each wing 79 comprises a pair of outwardly diverging ends 80 that are integral with a central flat center 81. The impeller 78 is formed by press fitting the aligned central portions 81 into the slot 84 (FIG. 5A) defined in the top portion 85 of the drive shaft 82. The drive shaft 82 is elongated and rigid, and it includes a central portion 88, a bottom portion 89, that are integral with top portion 85. The bottom includes a slot 91 similar to slot 84. Drive shaft 82 projects through an orifice 94 defined in floor plate 62 (FIG. 5A) that penetrates the center 95 of the coiled bimetallic spring 66.

Spring 66 has an inner tab 96 disposed generally in its center 95 that is press fitted within slot 91 to control the drive shaft. The opposite outer tab portion 98 of the spring 96 fits within a suitable slot 100 formed in a downwardly projecting tab 102 that is integral with floor plate 62. Thus relative torsional displacement of spring tab 96 causes torsional displacements of the drive shaft 82, rotating the impeller 78.

Figure 5:
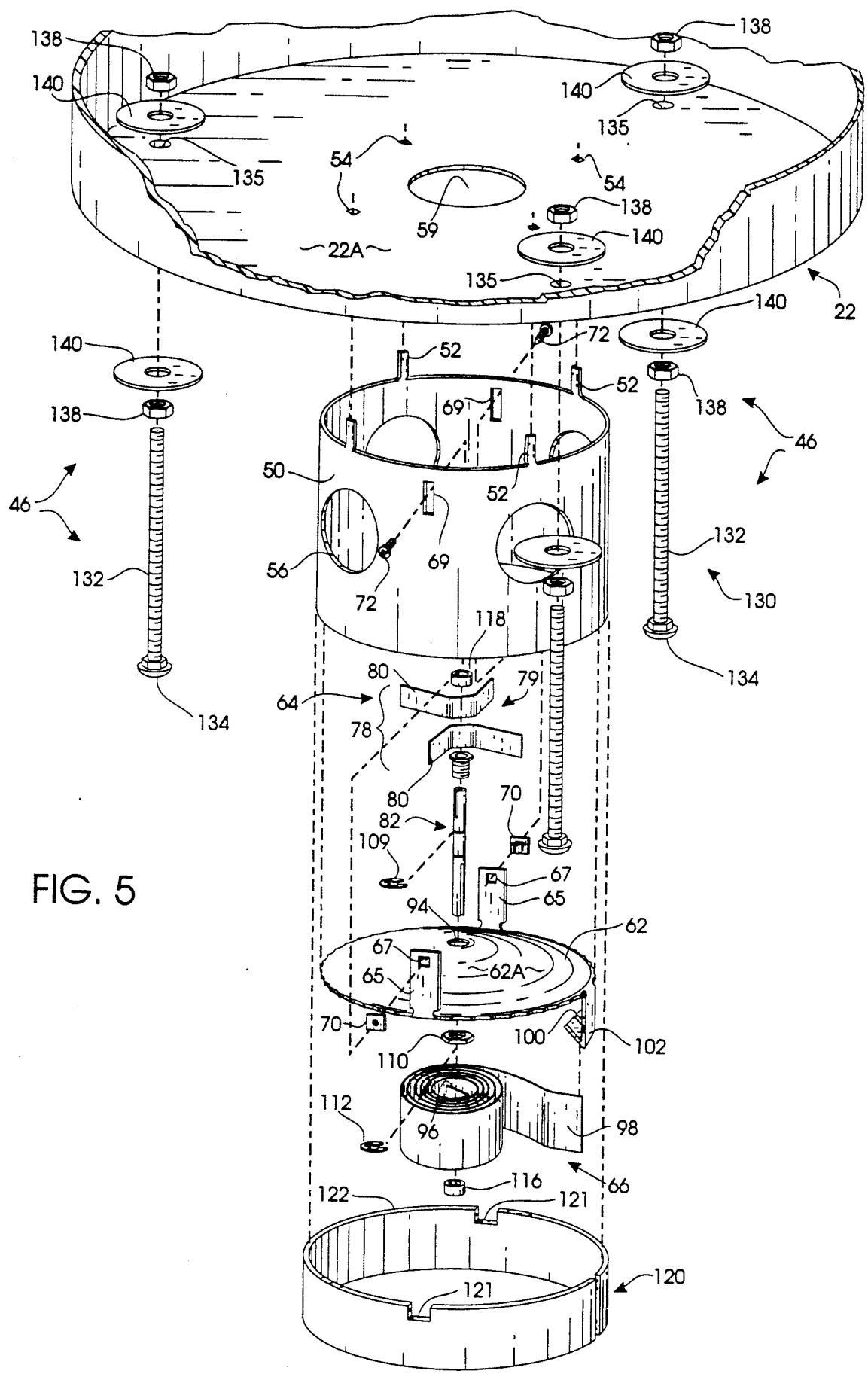
FIG. 5 is an enlarged, exploded, fragmentary isometric assembly view of the preferred game feeder.
Figure 5A:
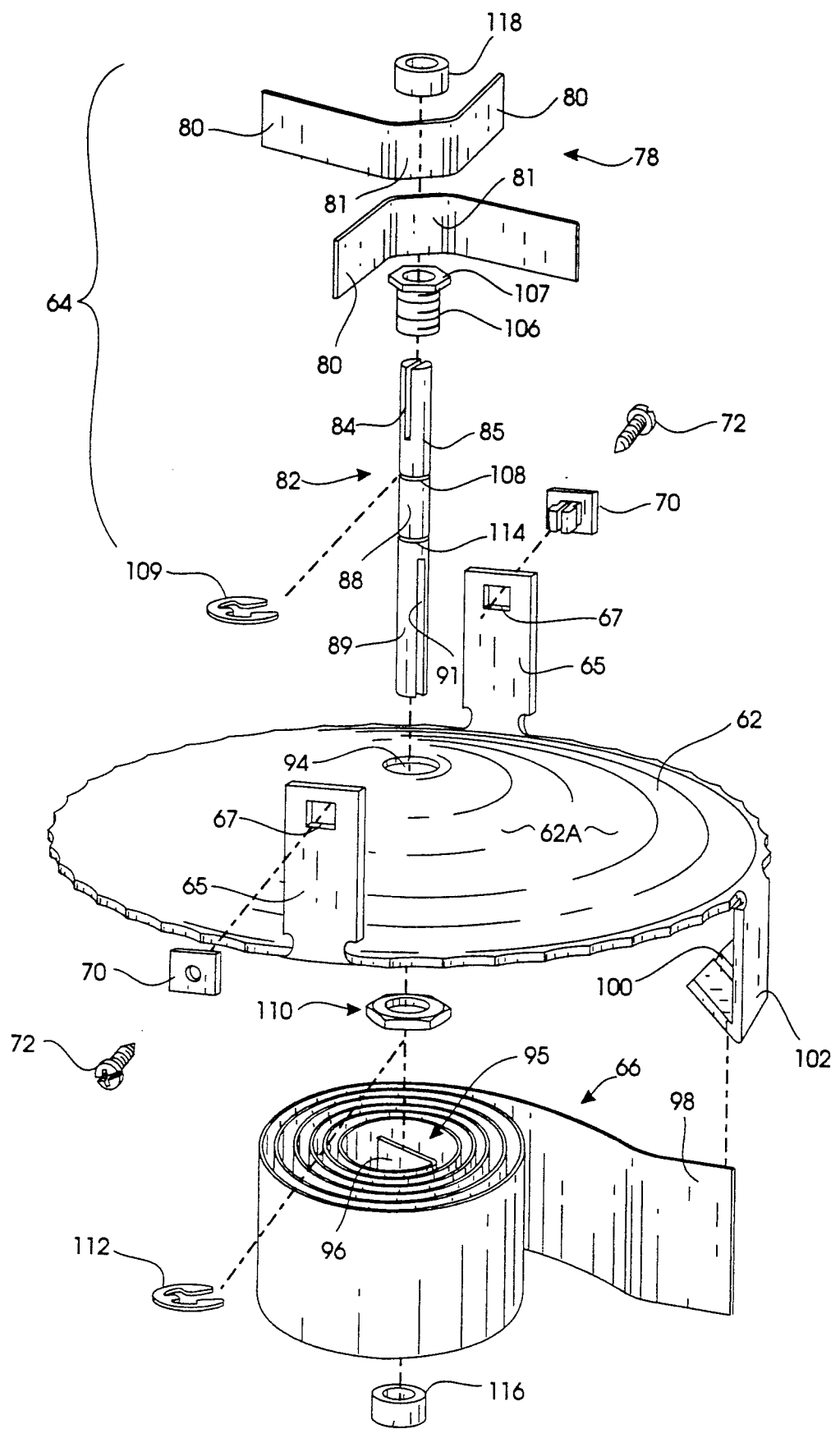
FIG. 5A is a further enlarged fragmentary view of the midportion of FIG. 5.

Drive shaft 82 is free to rotate within orifice 94 (FIGS. 5, 5A). A threaded collar bushing 106 fits through the shaft and penetrates orifice 94, being axially retained by its flange 107. When assembled, snap ring groove 108 in the drive shaft 82 receives a suitable snap ring 109 so that the shaft rests against the top flange 107 of bushing 106. The threaded shaft of bushing 106 is engaged by a suitable nut 110 to secure the bushing in place. Axial withdrawal of the shaft 82 upwardly relative to the bushing 106 is prevented by a snap ring 112 pressed within a lower snap ring groove 114 formed in the drive shaft. A lower collar 116 is press fitted to the slotted end 89 of the drive shaft beneath the bimetallic spring 66 in contact with the underside of internal tab 96 to complete the assembly. Optional collar 118 (FIG. 5A) complements collar 116 at the top of the shaft.

Figure 6:
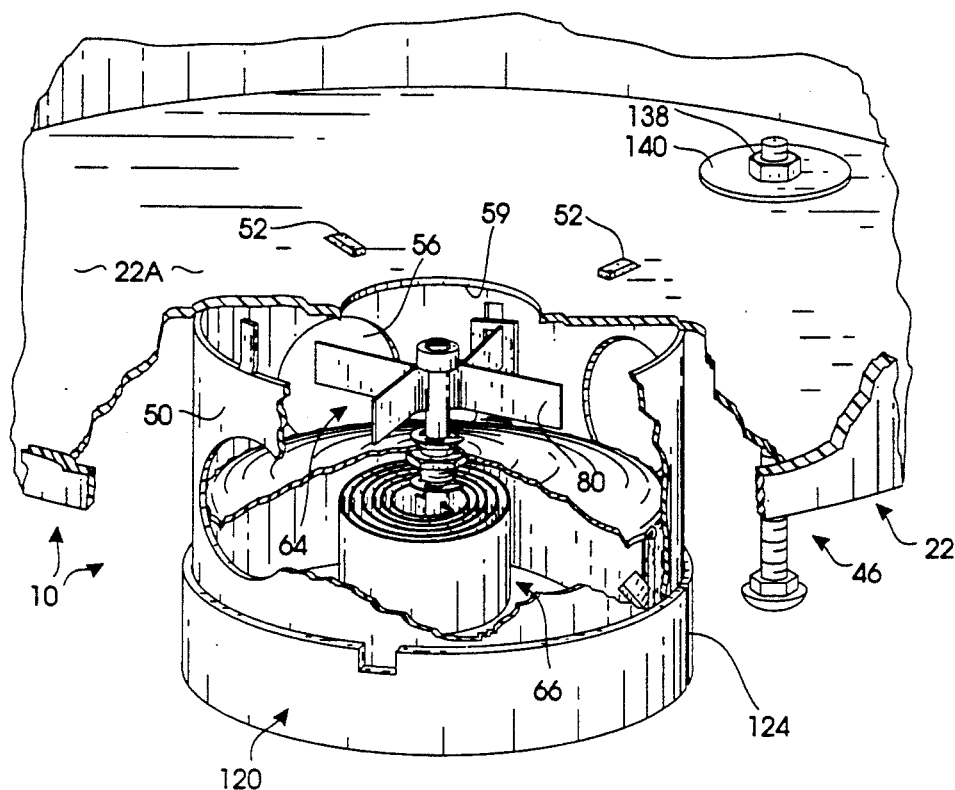
FIG. 6 is an enlarged, fragmentary isometric view of the assembled game feeder.

With reference primarily directed to FIGS. 5, 5A and 6, the discharge tube preferably includes an external circular restrictor band generally. designated by the reference numeral 120. The restrictor band 120 is frictionally slidable on the discharge tube and it may be adjusted as desired by the user to variably occlude the discharge orifices 56. It is desirable, for example, to temporarily block the feed discharge holes 56 to avoid spilling when the feeder 10 is being transported, filled, or installed.

Figure 7:
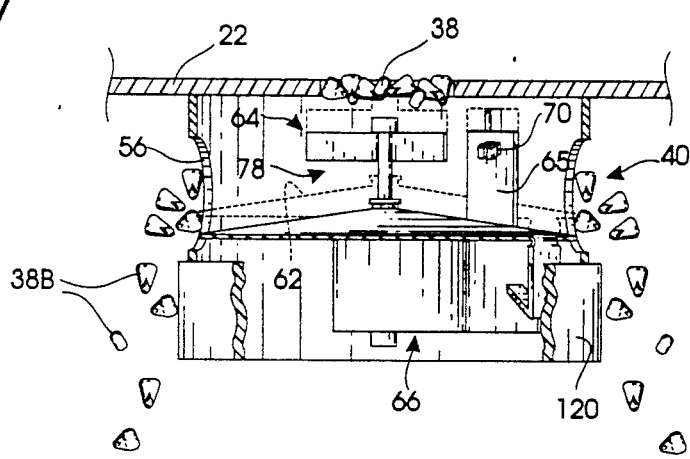
FIG. 7 is an fragmentary isometric view of my preferred game feeder, with moved positions illustrated in dashed lines.
Figure 8:
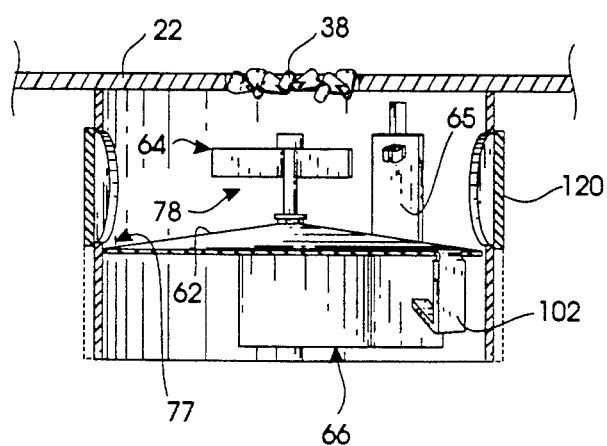
FIG. 8 is an fragmentary isometric view of my preferred game feeder, with the restrictor band moved to a feed discharge blocking position.

Restrictor band 120 is generally in the form of a ring, and it includes a pair of spaced apart clearance notches 121 in its upper periphery 122. The restrictor band 120 is slotted at 124 for relief. Notches 121 provide clearance for floor adjustment screws 72 (FIG. 5) when the restrictor band 120 is moved vertically upwardly on the discharge tube the maximum amount. Screw 72 will be centered within notches 121 to help torsionally maintain the restrictor band in this position when the feeder 10 is transported. When the apparatus is being set up, for example, it may be disposed upon the ground so that feet 46 supported as in FIG. 2. When the pail cover is removed, and filling begins, or when setting up the feeder 10 as in FIG. 1, feed must not be allowed to spill from the discharge orifices. At this time the restrictor band 120 is manually moved upwardly to cover the discharge orifices, as best seen in FIG. 8. In FIG. 7 it is seen how the restrictor band 120 can be lowered to allow feed 38B to escape the discharge orifice 56.

A comparison of FIG. 7 and 8 also reveals how the impeller assembly and the convex floor plate 62 can be moved vertically relative to the discharge orifices. FIG. 7 illustrates the upward position in dashed lines. In general, higher the impeller 78 is moved relative to the discharge orifices, the more feed will be discharged. When moved higher, the floor plate 62 smoothly abuts the discharge orifices, presenting a relatively unobstructed path for falling grain. When floor plate 62 is lowered somewhat below the discharge orifices, a dam 77 (FIG. 8) is formed. Particles of grain traversing the convex floor plate abut this impediment. The grain feed rate is thus reduced.

Feet 46 comprise an elongated carriage bolt 130 having a threaded shank 132 and a head 134. Bolts 130 are secured and suitable orifices 135 and the floor 22A of the pail between a pair of compression nuts 138 and washer 140.

Operation

Figure 2:
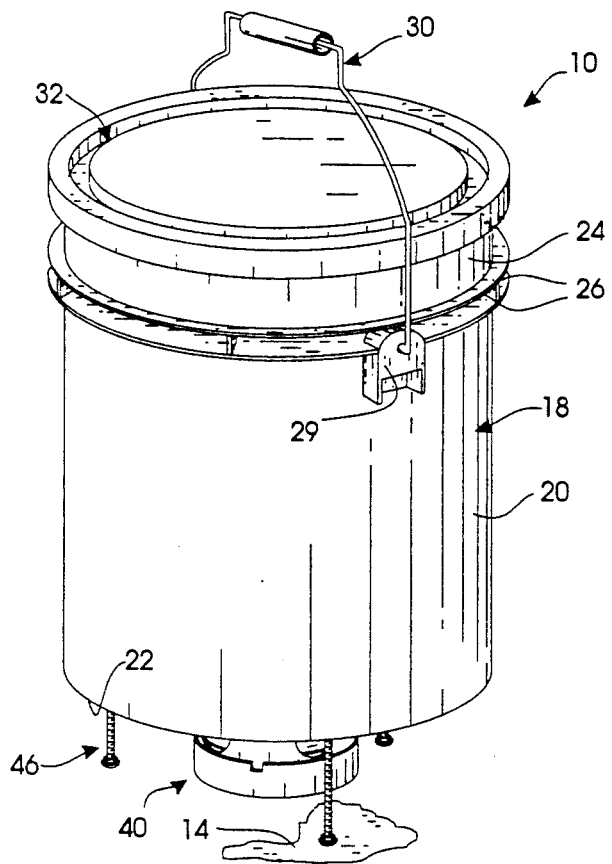
FIG. 2 is an isometric side view of my preferred game feeder.
Figure 3:
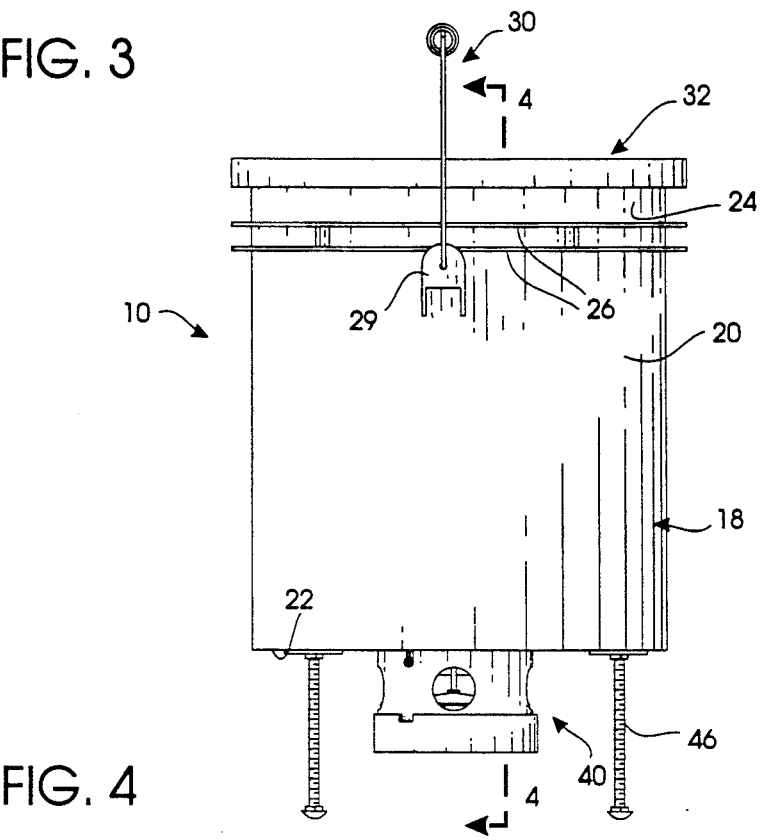
FIG. 3 is a side elevational view of my game feeder.

To fill the feeder it is best placed on the ground as in FIG. 2. The top is then removed, and the restrictor band 120 is moved upwardly to cover the discharge orifices 56. Once the pail is full of grain or corn, the feeder 10 is suspended high enough above ground so that the deer 17 cannot reach it. By suspending it with rope, squirrels have a harder time stealing the feed. When the bottom of the rope is tied to the tree trunk, as in FIG. 1, it is much easier for the owner to service the feeder. The feeder must be hung level to operate properly.

The activator assembly must be adjusted for the proper feed discharge rate. In this regard, screws 72 (FIG. 5, 5A) can be loosened, so that the impeller assembly and the convex floor plate 62 may be moved upwardly or downwardly within the discharge tube 50. Adjustments can be facilitated with a hair dryer that applies heat to the bimetallic spring 66. Each time the spring heats or cools, the impeller will turn, driving grain through the discharge orifices. Tests can be accelerated by cooling the spring with the cold air function of the hair dryer.

It is recommended that several feeders be suspended along known game trails. When the feeders are adjusted to dispense only a small amount of grain along a known game trail, deer movement is likely to increase. Where squirrels are in the area, it is suggested that about six feet of wire be used between the bucket and the rope, and that the bucket be suspended about ten feet from the tree or limbs. In the best mode known to me, clean corn is used. Filling is necessary only once a month. Pieces of corncob or corn stalk will clog up the feeder and they should not be used.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A game feeder comprising:
    a container for storing feed to be dispensed;
    a plurality of feed discharge orifices defined in said container;
    a rotary impeller for deflecting feed through said orifices; and,
    a bimetallic spring for torsionally driving said impeller in response to temperature changes, whereby said impeller dispenses feed through said feed discharge orifices.

2. The feeder as defined in claim 1 further comprising an external restrictor band for selectively blocking said feed discharge orifices.

3. The feeder as defined in claim 1 wherein the position of said impeller is vertically adjustable relative to said orifices so the rate of feed discharge may be adjusted.

4. The game feeder as defined in claim 1 wherein
    said impeller is mounted within a discharge tube that connects to said pail; and,
    said discharge orifices are defined in said tube.

5. The game feeder as defined in claim 4 wherein said impeller is rotatably mounted to a convex floor that is adjustably mounted within said tube.

6. The game feeder as defined in claim 5 wherein said impeller is captivated upon a rigid shaft that extends axially downwardly through said floor and connects to said spring.

7. The feeder as defined in claim 6 wherein
    said impeller comprises a pair of cooperating wings each having flat centers adapted to be coupled together;
    said shaft comprises a slotted top and a slotted bottom;
    said impeller flat centers are fastened within said slotted top; and,
    said slotted bottom receives a portion of said spring.

8. A game feeder comprising:
    an enclosure for storing feed; and,
    an adjustable activator assembly in communication with said enclosure, said activator receiving and distributing feed from said enclosure, said activator assembly comprising:
    a discharge tube comprising a plurality of feed discharge orifices;
    a rotary impeller disposed within said tube for agitating feed; and,
    a bimetallic spring for torsionally driving said impeller in response to temperature changes whereby said impeller dispenses feed through said feed discharge orifices.

9. The feeder as defined in claim 8 further comprising a restrictor band adapted to be externally circumferentially coupled to said enclosure for selectively blocking said feed discharge orifices.

10. The game feeder as defined in claim 8 wherein said impeller is rotatably mounted to a convex floor that is adjustably mounted within said tube to selectively vary the position of said impeller relative to said orifices, whereby the rate at which feed is dispensed can be varied.

11. The feeder as defined in claim 10 wherein said impeller comprises:
    a pair of cooperating wings each having flat centers adapted to be coupled together;

a rigid shaft comprising a slotted top and a slotted bottom;

said impeller flat centers are matingly fastened together within said slotted top; and, said slotted bottom is coupled to a portion of said spring.

12. The feeder as defined in claim 11 wherein said impeller is mounted upon a rigid shaft that extends axially downwardly through said floor through a bushing and connects to said spring;

said shaft has a central midportion defined between a pair of spaced apart snap ring grooves, and said shaft is axially secured by a pair of snap rings fitted in said grooves on opposite sides of said bushing.

13. The feeder as defined in claim 11 wherein said bimetallic spring comprises an internal tab coupled to said shaft slotted bottom of said shaft and an external tab coupled to said floor.

14. The feeder as defined in claim 10 wherein said floor comprises upwardly projecting, apertured mounting tabs, and said tube comprises mounting slots adapted to register with said apertured mounting tabs.

15. A deer feeder comprising:

a pail adapted to be suspended above an area traversed by deer for storing feed;

a feed discharge tube mounted beneath said pail;

a plurality of feed discharge orifices defined in said tube;

a convex floor within said tube proximate said orifices for guiding feed toward said orifices;

a rotary impeller associated with said floor for deflecting feed through said orifices;

a bimetallic spring for torsionally driving said impeller in response to temperature changes; and, said impeller captivated upon a rigid shaft that extends axially downwardly through said floor and connects to said spring whereby said impeller agitates feed in response to said spring and feed is thus distributed into said area in response to temperature changes.

16. The deer feeder as defined in claim 15 further comprising means for varying the position of said floor and thus said impeller relative to said orifices, whereby the rate at which feed is dispensed can be varied.

17. The deer feeder as defined in claim 15 further comprising an external restrictor band circumferentially engaging said feed discharge tube for selectively blocking said feed discharge orifices.

18. The deer feeder as defined in claim 15 wherein said impeller comprises a pair of cooperating wings, each wing having flat centers adapted to be coupled together;

said shaft comprises a slotted top, a slotted bottom, and a central midportion defined between a pair of spaced apart snap ring grooves, said shaft axially secured by a pair of snap rings fitted in said grooves on opposite sides of said floor;

said impeller flat centers are fastened within said slotted top; and, said slotted bottom is coupled to an internal tab on said spring..

19. The deer feeder as defined in claim 18 further comprising means for varying the position of said floor and thus said impeller relative to said orifices, whereby the rate at which feed is dispensed can be varied.

20. The deer feeder as defined in claim 19 further comprising an external restrictor band circumferentially engaging said feed discharge tube for selectively blocking said feed discharge orifices.

* * * * *